United States Patent
Stochosky et al.

(10) Patent No.: US 7,343,561 B1
(45) Date of Patent: Mar. 11, 2008

(54) METHOD AND APPARATUS FOR MESSAGE DISPLAY

(75) Inventors: Michael Stochosky, San Francisco, CA (US); Jens Peter Alfke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 816 days.

(21) Appl. No.: 10/741,936

(22) Filed: Dec. 19, 2003

(51) Int. Cl.
*G06F 3/00* (2006.01)

(52) U.S. Cl. .................. 715/758; 715/715

(58) Field of Classification Search .......... 715/715, 715/758, 808, 809, 863
See application file for complete search history.

(56) References Cited

U.S. PATENT DOCUMENTS

| | | | |
|---|---|---|---|
| 5,072,412 | A | 12/1991 | Henderson, Jr. et al. |
| 5,617,539 | A | 4/1997 | Ludwig et al. |
| 5,854,893 | A | 12/1998 | Ludwig et al. |
| 5,880,731 | A * | 3/1999 | Liles et al. ............... 715/758 |
| 5,896,500 | A | 4/1999 | Ludwig et al. |
| 5,943,049 | A * | 8/1999 | Matsubara et al. ......... 715/715 |
| 5,990,887 | A * | 11/1999 | Redpath et al. ............ 715/758 |
| 6,237,025 | B1 | 5/2001 | Ludwig et al. |
| 6,351,762 | B1 | 2/2002 | Ludwig et al. |
| 6,434,604 | B1 * | 8/2002 | Harada et al. ............. 709/207 |
| 6,437,818 | B1 | 8/2002 | Ludwig et al. |
| 6,594,688 | B2 | 7/2003 | Ludwig et al. |
| 6,784,901 | B1 * | 8/2004 | Harvey et al. ............. 715/757 |
| 7,234,117 | B2 * | 6/2007 | Zaner et al. ............... 715/758 |

OTHER PUBLICATIONS

D. Kurlander, T. Skelly, D. Salesin. Comic Chat. In: Proc. of SIGGRAPH 96, pp. 225-236, New Orleans, LA, ACM SIGGRAPH, 1996.
Liam Bannon et al., "Evaluation and Analysis of Users' Activity Organization," CHI '83 Proceedings, Dec. 1983, pp. 54-57.
Peter C. S. Wong et al., Flair-User Interface Dialog Design Tool, Computer Graphics vol. 16, No. 3, Jul. 1982, pp. 87-98.
David R. Cheriton, "Man-Machine Interface Design for Timesharing Systems," University of Waterloo, Ontario, Canada, 1976, pp. 362-366.

(Continued)

*Primary Examiner*—Weilun Lo
*Assistant Examiner*—Kim-Lynn Dam
(74) *Attorney, Agent, or Firm*—Blakely, Sokoloff, Taylor & Zafman LLP (57) ABSTRACT

Methods and apparatuses for displaying chat messages in selectable balloon styles. In one aspect of the present invention, a method to display a chat message includes: receiving a chat message and a balloon style; and displaying the chat message in a balloon of the received balloon style. In one example, the chat message and the balloon style are received from a network connection; and, the balloon style is selected by a user who sent the chat message. In one example, the chat message and the balloon style are received from input devices for user interaction; and, the chat message and the balloon style is also transmitted to a remote device for display. In one example, the balloon style indicates an emotional state (e.g., happy, angry) associated with the message. In another example, the balloon style indicates a predetermined message (e.g., the user is in the process of preparing a message). In one example, the balloon style is user customized (or user defined).

54 Claims, 9 Drawing Sheets

OTHER PUBLICATIONS

Michael Good, "Etude and the Folklore of User Interface Design," Laboratory for Computer Science, Massachusetts Institute of Technology, Cambridge, Massachusetts, USA, ACM 1981, pp. 34-43.

D. Austin Henderson, Jr. et al., "Rooms: The Use of Multiple Virutal Workspaces to Reduce Space Contention in a Window-Based Graphical User Interface," ACM Transactions on Graphics, vol. 5, No. 3, Jul. 1986, pp. 211-243.

Stuart K. Card et al., "A Multiple, Virtual-Workspace Interface to Support User Task-Switching," CHI +GI 1987, ACM, pp. 53-59.

Eugene Ball et al., "A Test-Bed for User Interface Designs," Carnegie Mellon University, Pittsburgh, PA , USA, ACM 1981, pp. 85-88.

Warren Teitelman, "Ten Years of Window Systems—A Retrospective View," Methodology of Window Management, Proceedings of an Alvey Workshop at Cosener's House, Abingdon, UK, Apr. 1985. 13 pages.

Eve M. Schooler et al., "Multimedia Conferencing: Has it Come of Age?", Reprinted from the Proceedings 24$^{th}$ Hawaii International Conference on System Sciences, vol. 3, pp. 707-716 (Jan. 1991) pp. 1-10.

Eve M. Schooler, "A Distributed Architecture for Multimeda Conference Control," ISI Research Report, Nov. 1991, University of Southern California Information Sciences Institute, Title page, +pp. 1-18.

Eve M. Schooler, "The Connection Control Protocol: Architecture Overview," Version 1.0, USC/Information Sciences Institute, Jan. 1992, pp. 1-6.

Joseph D. Touch, "Zoned Analog Personal Teleconferencing (ZAPT)," USC/ Information Sciences Institute, Feb. 1994, pp. 1-19.

Eve M. Schooler, "Case Study: Multimedia Conference Control in a Packet-switched Teleconferencing System," USC/Information Sciences Institute, 1993, pp. 1-17.

Terrence Crowley, et al., "MMConf: An Infrastructure for Building Shared Multimedia Applications," CSCW '90 Proceedings, Oct. 1990, pp. 329-342.

Harry Forsdick, "Explorations into Real-time Multimedia Conferencing," Computer Message Systems- 85, IFIP, 1986, pp. 331-347.

Robert W. Root, "Design of a Multi-Media Vehicle for Social Browsing," Bell Communications Research, Morristown, NJ, USA, ACM 1988, pp. 25-38.

S. R. Ahuja et al., "A Comparison of Application Sharing Mechanisms in Real-Time Desktop Conferencing Systems," AT&T Bell Laboratories, Holmdel, NJ, USA, ACM 1990, pp. 238-248.

Hiroshi Ishii, "TeamWorkStation: Towards a Seamless Shared Workspace," NTT Human Interface Laboratories, Japan, CSCW '90 Proceedings, Oct. 1990, pp. 13-26.

Thomas Kaeppner et al., Architecture of HeiPhone: A Testbed for Audio/Video Teleconferencing, IBM European Networking Center, Heidelberg, 1993, pp. 1-17.

Kankanahalli Srinivas et al., "MONET: A Multi-media System for Conferencing and Application Sharing in Distributed Systems," CERC Technical Report Series Research Note, Feb. 1992, 10 pages (2-sided).

* cited by examiner

METHOD AND APPARATUS FOR MESSAGE DISPLAY

FIELD OF THE INVENTION

The invention relates to graphical user interfaces, and more particularly to the display of chat or instant messages.

BACKGROUND

With the development of computer network environments (e.g., Internet) and telecommunication systems (e.g., wireless cellular communication network), devices and software programs have been developed for text-based communication for online chat. In the present application, chat refers to real time text conversation (e.g., instant messaging) and it may also refer to text messaging in which the conversation may not be in real time.

People participating in an online chat don't have the benefit of voice inflection to help them convey the context in which a particular statement is made. Thus, many text based expressions (e.g., ":)", ":(" and others) have been used along with the text message to convey the emotional state of the sender of the message.

Among many chat programs for online communication through a computer network, a system called Comic Chat has been developed. A comic chat program represents on-line communications in the form of comics, since comics are very appealing. A comic chat program automatically generates many aspects of the comics that depicts the online conversation, including balloon construction and layout, the placement and orientation of comic characters, the default selection of character gestures and expressions, and others.

SUMMARY OF THE DESCRIPTION

Methods and apparatuses for displaying chat messages in selectable balloon styles are described here. Some of the embodiments of the present invention are summarized in this section.

In one aspect of the present invention, a method to display a chat message includes: receiving a chat message and a balloon style; and displaying the chat message in a balloon of the received balloon style. In one example, the chat message and the balloon style are received from a network connection; and, the balloon style is selected by a user who sent the chat message. In one example, the chat message and the balloon style are received from input devices for user interaction; and, the chat message and the balloon style is also transmitted to a remote device for display. In one example, the balloon style indicates an emotional state (e.g., happy, angry) associated with the message. In another example, the balloon style indicates a predetermined message (e.g., the user is in the process of preparing a message). In one example, a definition of the balloon style is received from a user; and, the definition of the balloon style is user created. In one example, the definition of the balloon style is received before the chat message is composed. In another example, the definition of the balloon style is received with the chat message through a network connection.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to an or one embodiment in the present disclosure are not necessary to the same embodiment; and, such references means at least one.

Figure 1:
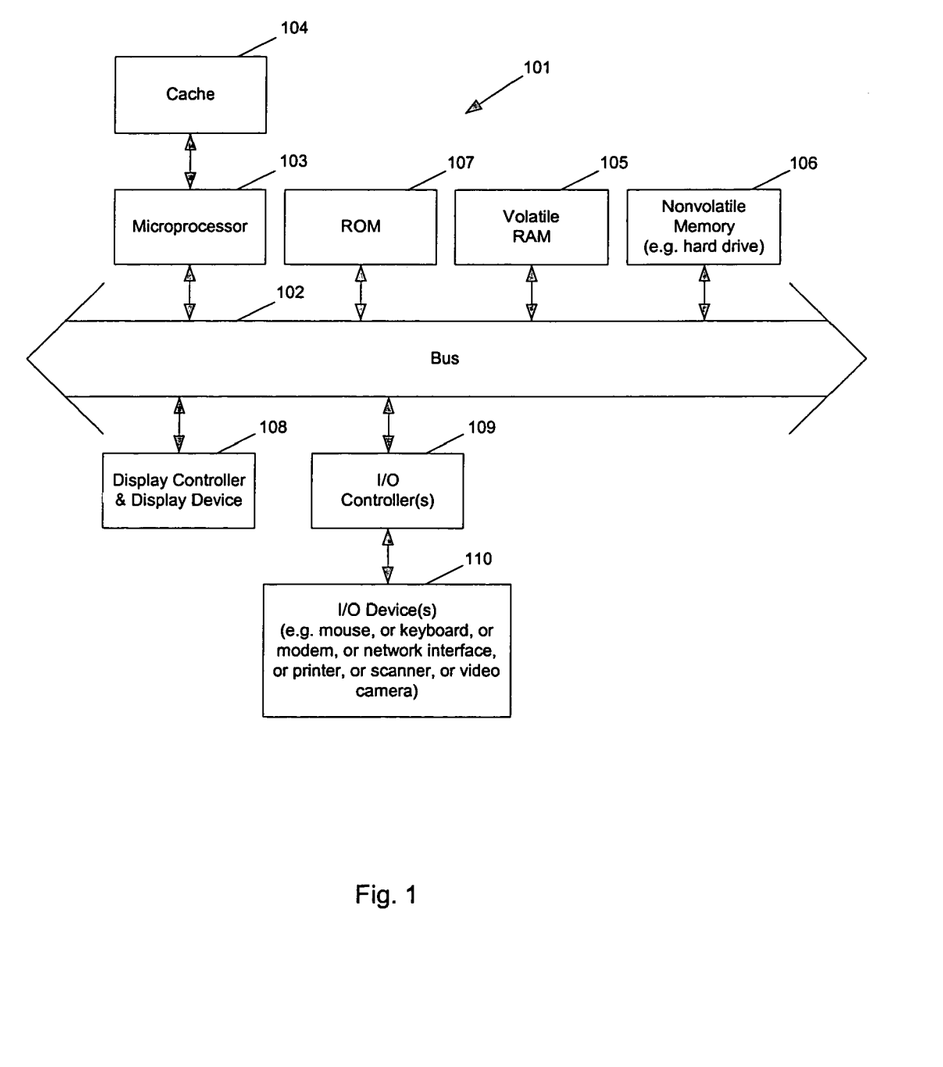
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems (e.g., a palm top device or handheld device, or a cellular phone, or other) which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In at least one embodiment of the present invention, the text messages are displayed in balloons on a graphical user interface. The style of the balloons is selectable by a user to indicate a context that is associated with the text message, thus helping to convey the meaning of the message. In general, a computer program may not have sufficient intelligence to correctly extract the context of a text message; and, a message sender may not explicitly indicate the context in the text message, in which case even a human reader may not be able to extract the context. Thus, it is understood that an automatically generated balloon based on the text message may not accurately reflect what the sender wishes to convey. At least one embodiment of the present invention allows a user to specify a balloon (e.g., a user edited and customized balloon, or one selected from of a set of standard balloons, such as a library of available predesigned balloons) to indicate a characteristic of the message (e.g., an emotional state such as happy, angry, and others) or a subtle message. Thus, selectable graphical labels, such as balloon styles, are provided with the message so that the context (e.g., emotional state) can be readily conveyed for the correct interpretation of the message.

Figure 2:
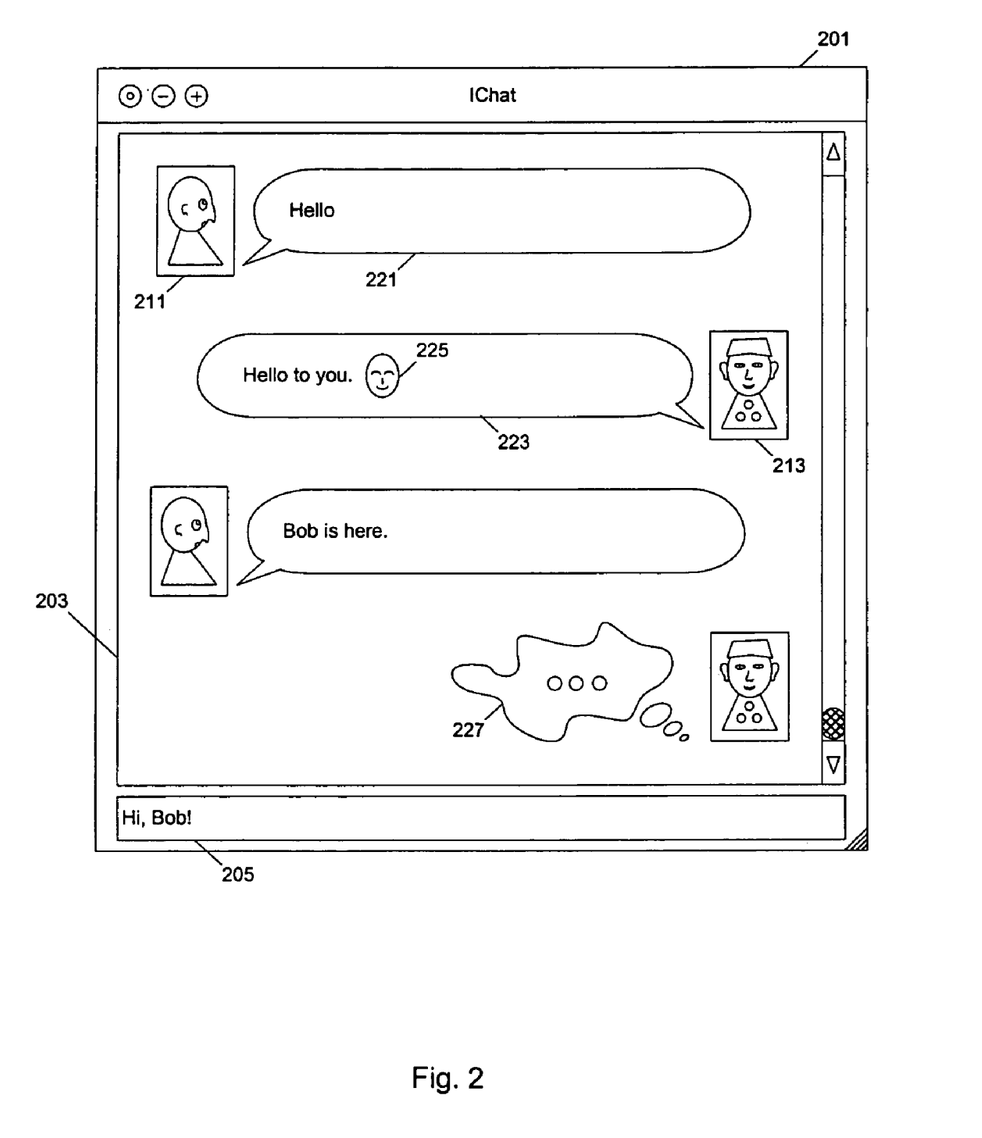
FIGS. 2-4 illustrate scenarios of using a chat program according to one embodiment of the present invention.
Figure 3:
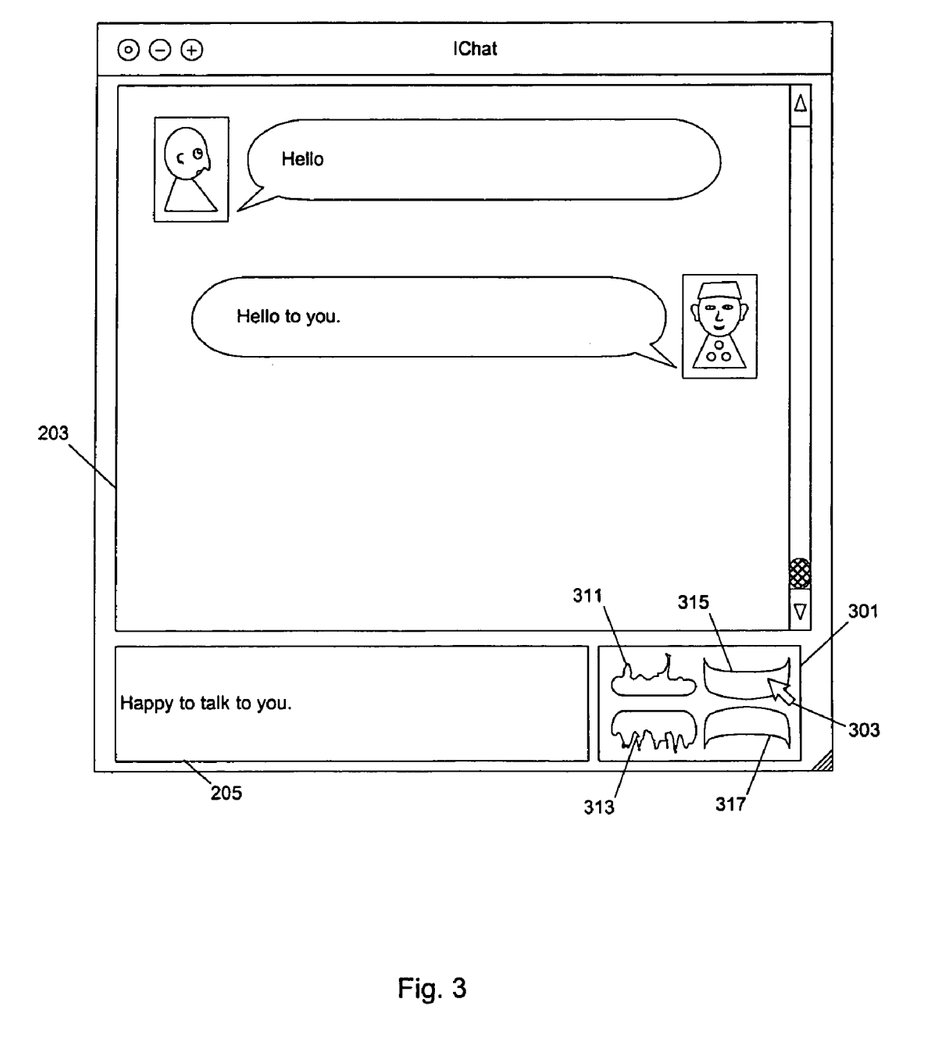
Figure 4:
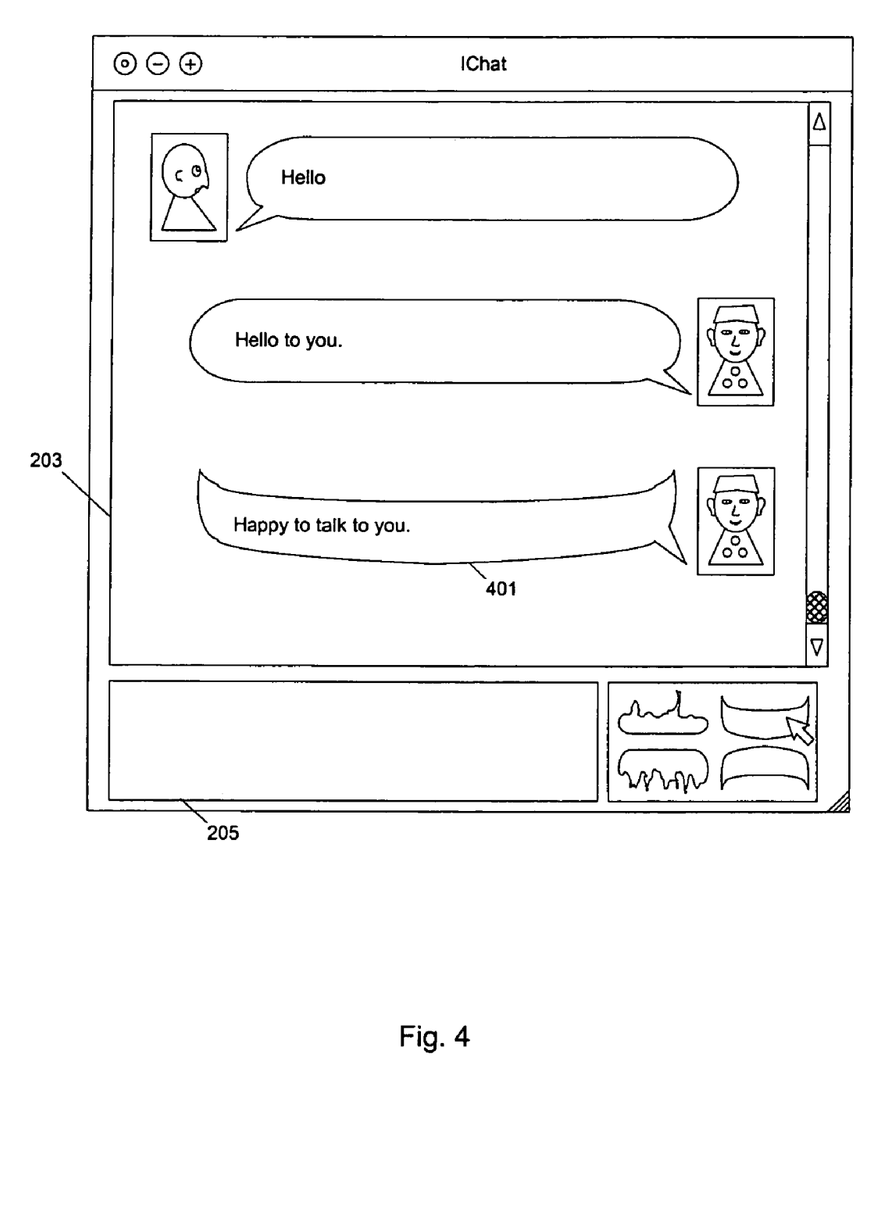

FIGS. 2-4 illustrate scenarios of using a chat program according to one embodiment of the present invention. In FIG. 2, window 201 depicts a screen of a chat program. However, it is understood that a separate window may not be used in a palm top device (e.g., a cellular phone, or a handheld computer, such as a palm handheld), on which the chat program may occupy the entire screen of the display device. In FIG. 2, icon 211 represents the remote user; and, icon 213 represents the local user. When a message is received from a remote user, a balloon (e.g., 221) is shown to display within it the text message sent by the remote user. Similarly, when a local user enters a message (e.g., through text entry box 205), a balloon (e.g., 223) is displayed to show the message to the remote user by the local user; and, the message is also transmitted to the remote chat program for display. When a recognizable token is received (e.g., ":-)"), the chat program automatically replaces it with a corresponding graphical representation (e.g., icon 225). When the user is in the process of preparing a message (e.g., typing in text entry box 205), a special balloon (e.g., "thinking" balloon 227) is displayed to indicate such a state. An empty message (or other special tokens) can be sent to the remote program to cause the display of a thinking balloon in a similar way. Note that a computer system can automatically determine that the user is in the process of preparing a message (e.g., upon the detection of the user typing in text entry box 205).

Although the example of FIG. 2 and some other examples of this description illustrate the situation where the balloons containing the messages and the icons representing the users are displayed within a window (e.g., a window for a chat program), it is not necessary to display all these items in a single window. For example, the balloons and the user icons can be displayed on a desktop environment or a window-less environment of a computer system or other data processing system (e.g., a display of a cell phone). Alternatively, they may be displayed in multiple windows.

In FIG. 3, a user chooses to use different balloon styles to convey additional meaning for the interpretation of the message. For example, after composing the text message, the user may use cursor 303 (or other means, such as a short cut key, a function key or an arrow key or a tab key, through input devices such as a keyboard, a mouse, a track ball, a touch screen, a voice recognition system, etc.) to select a balloon style that is to be used to display the message. Note that the balloon style may be selected before or during the composition of the message; and, a previous (default) style may be used when the user does not change the selection.

After the message and the balloon style is sent (or confirmed for sending), the chat program displays the message in the selected balloon style. For example, after the user sends the text message using balloon style 315 in FIG. 3, balloon 401 is shown with the text message displayed within it in FIG. 4.

The text message and its associated balloon style are sent to the remote program for display; and, the remote program displays the text message in a balloon of the specified style in a similar fashion as the local program. Alternatively, it may display the text message in a balloon that has a balloon style similar to the specified style. Note that the local program and the remote program may draw balloons of a specified style different. For example, a standard "happy balloon style" in the local program may have a different appearance than a standard "happy balloon style" in the remote program. In one embodiment of the present invention, the programs may share and/or exchange balloon style definitions so that the balloons of the same style has the same appearance. Alternative, the balloons of the same style may be displayed differently at different programs according to their respective standard rendering of the specified style. For example, different chart programs may not use the same protocol for communicating the definition of balloon styles. Thus, when a remote program cannot communicate with the local program to drawing the balloon in the same appearance as the local program would, the remote program can still draw the balloon according to its known style definitions in its library. When the remote program receives a message with a style which it does not understand, the remote program may substitute it with a different style (e.g., a standard plain balloon, or a standard balloon which shows that a customized balloon was used by the user). The remote program may further provide means for the user to see the customization of the balloon in response to the user request. For example, if the user selects the balloon, a message can be displayed to show that the name of the balloon style specified by the local program. The remote program may also ignore the specified balloon styles it does not understand or ignore all balloon styles (e.g., in response to a user request). If the remote program does not support the use of a specified balloon style, the remote program may ignore the indication of the specified style. In one embodiment of the present invention, the local chat program determines if the remote chat program accepts the indications of a balloon style; and, the indication of a user specified balloon style is sent only if the remote chat program supports it.

In one embodiment of the present invention, a set of standard selectable balloon styles are pre-installed with the chat program to indicate a set of standard context information (e.g., cold, cool, warm, hot, angry, calm, happy, and others). Thus, the user may select one from a standard library of styles. Further, in one embodiment of the present invention, a user can construct a customized balloon style (e.g., through drawing a balloon, or combining a set of standard balloon constructing elements). The user may further specify the text explanation of the style, such that a receiver may display the explanation of the style to a remote user upon request. For example, when the user places the cursor on the balloon displayed on the screen, a pop-up window (e.g., a flash help window or a tooltip window) can show the text explanation of the style (e.g., this balloon style shows that I am happy). Thus, a group of users may develop a set of their own "balloon languages" over a period of time for communications.

The user-customized balloon may be transmitted to the remote chat program when the communication is first established. For example, after the communication between two chat programs is established, the chat programs automatically communicate with each other (e.g., in a background process while no text message communication is taking place) to negotiate and exchange the definition of balloon styles. Thus, when required, a customized balloon can be drawn immediately. The chat program may optionally store the received definition of customized balloon styles for future communication sessions. Alternatively, the customized balloon may be transmitted only when needed (e.g., on demand). Further, the chat programs may be configured to transmit and store the received definitions of customized balloon styles according to a user preference (e.g., based on the identity of the remote user).

Figure 5:
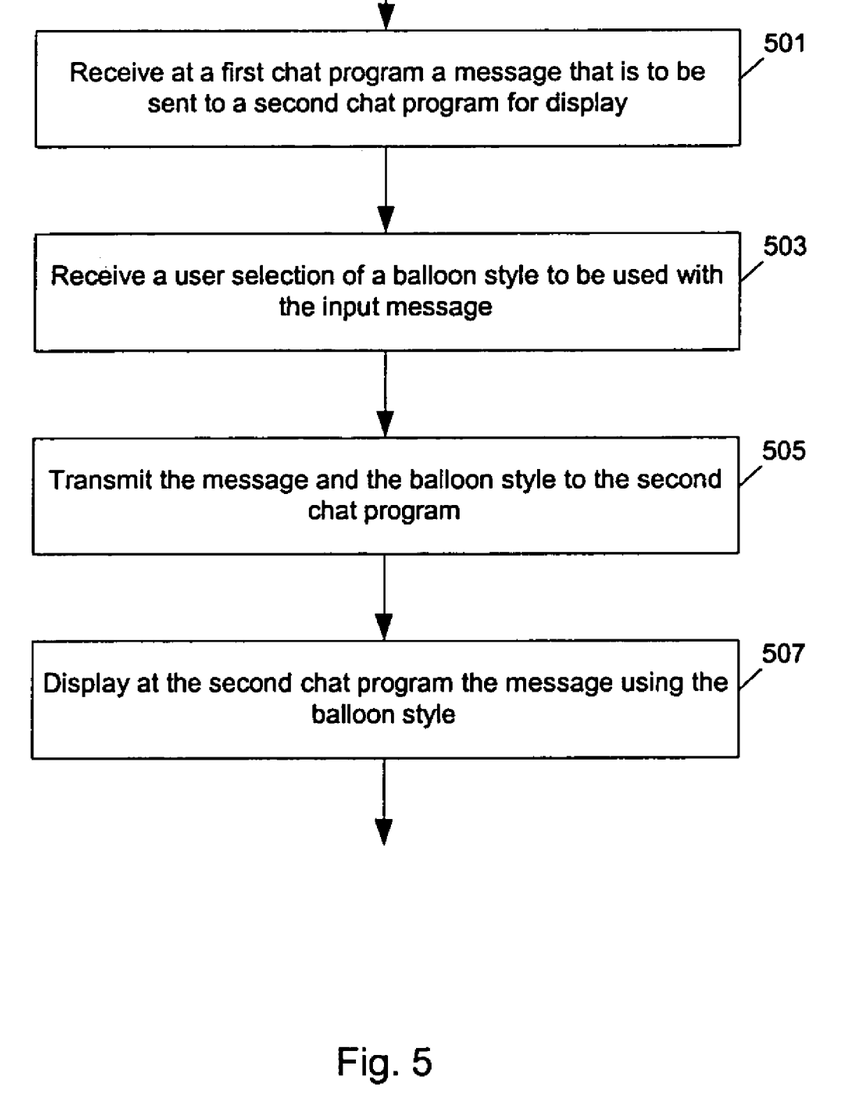
FIG. 5 shows a method to display a chat message according to one embodiment of the present invention.

FIG. 5 shows a method to display a chat message according to one embodiment of the present invention. In operation 501, a first chat program receives a message that is to be sent to a second chat program for display. The first chat program receives a user selection of a balloon style to be used with the input message in operation 503. This selection may be from a palette or library of balloon styles. After operation 505 transmits the message and the balloon style from the first chat program to the second chat program, the second chat program displays the message using the balloon style in operation 507.

Figure 6:
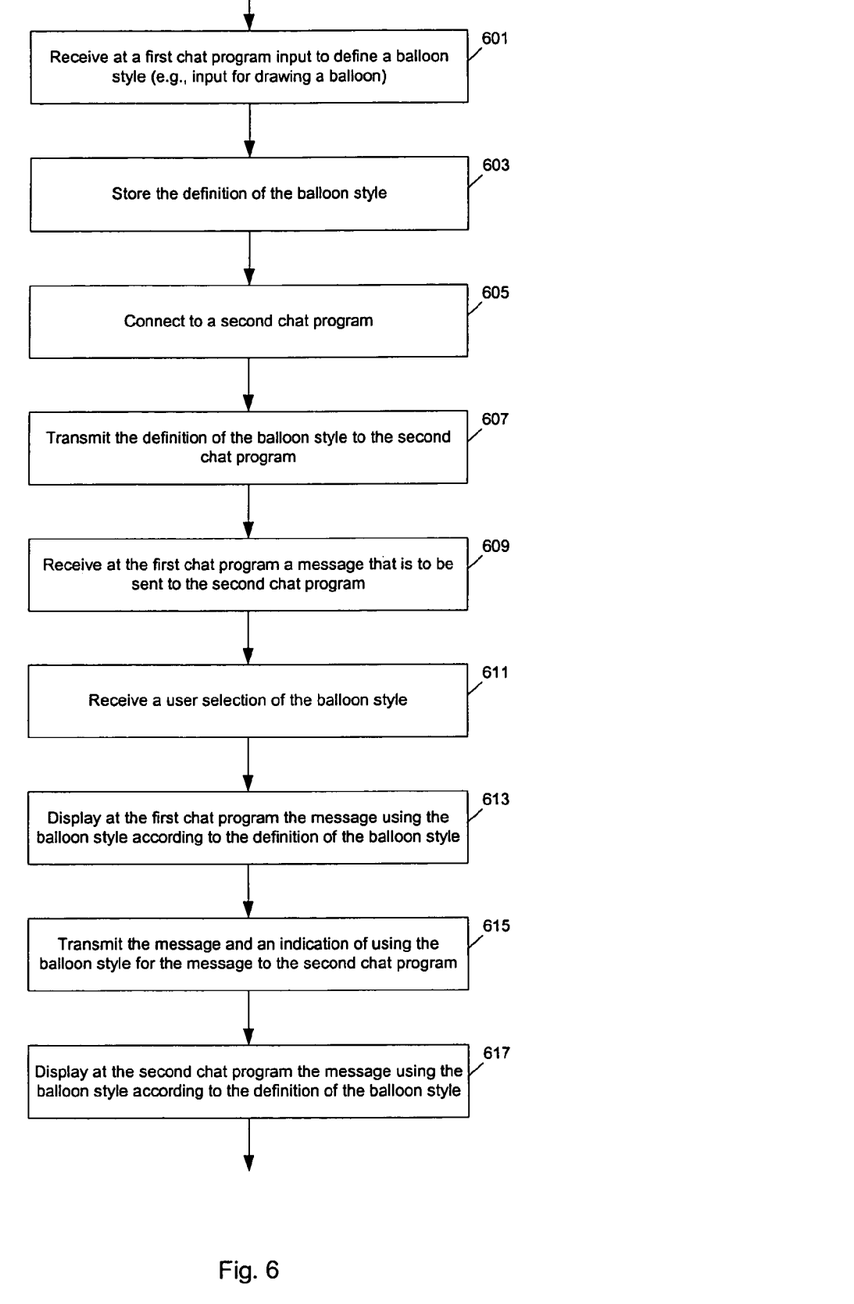
FIG. 6 shows a method to display a chat message in a user-defined balloon according to one embodiment of the present invention.

FIG. 6 shows a method to display a chat message in a user-defined balloon according to one embodiment of the present invention. Operation 601 receives at a first chat program input to define a balloon style (e.g., input for drawing a user customized balloon). Operation 603 stores the definition of the balloon style. Operation 605 connects to a second chat program. Operation 607 transmits the definition of the balloon style to the second chat program (e.g., during a idle time during which no text message communication is taking place). Operation 609 receives at the first chat program a message that is to be sent to the second chat program (e.g., from input devices for user interaction, such as a keyboard, a mouse, a track ball, a touch screen, a voice recognition system, etc.). Operation 611 receives a user selection of the balloon style. Operation 613 displays at the first chat program the message using the balloon style according to the definition of the balloon style. Operation 615 transmits the message and an indication of using the balloon style for the message to the second chat program. Operation 617 displays at the second chat program the message using the balloon style according to the definition of the balloon style.

Figure 7:
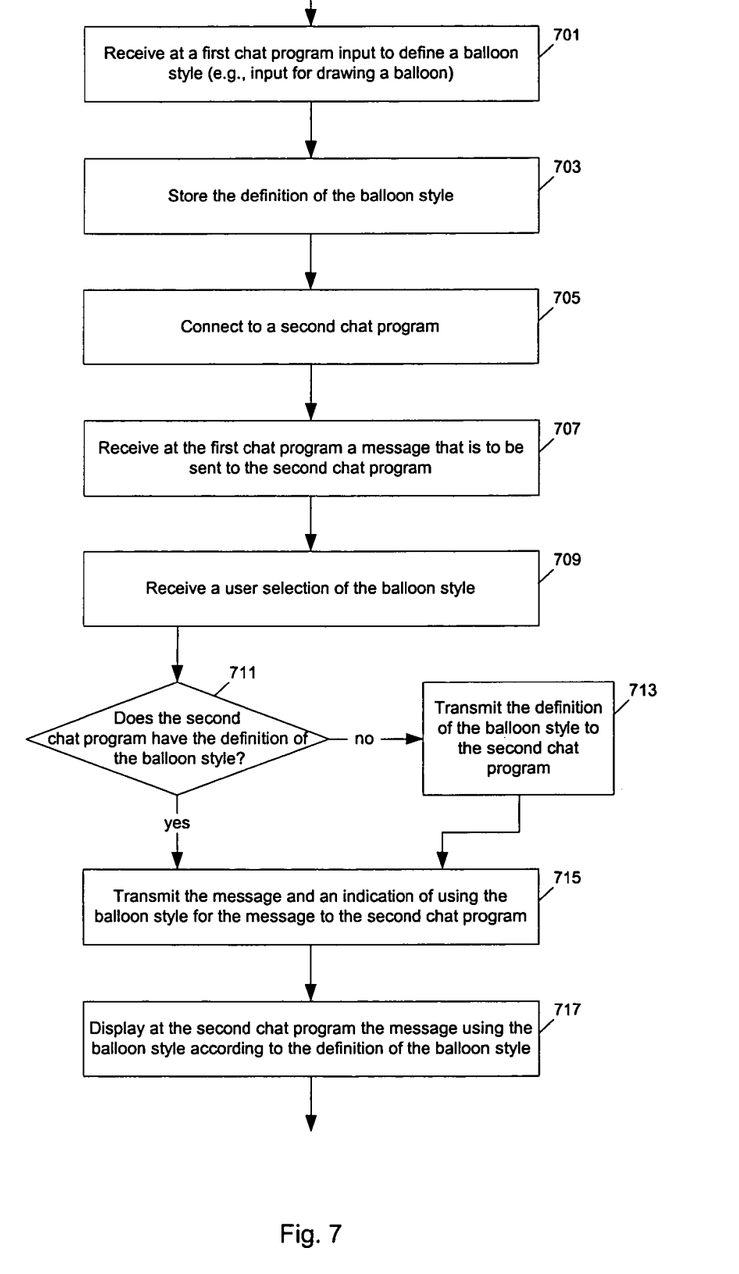
FIG. 7 shows another method to display a chat message in a user-defined balloon according to one embodiment of the present invention.

FIG. 7 shows another method to display a chat message in a user-defined balloon according to one embodiment of the present invention. Operation 701 receives at a first chat program input to define a balloon style (e.g., input for drawing a balloon). Operation 703 stores the definition of the balloon style. Operation 705 connects to a second chat program. Operation 707 receives at a first chat program a message that is to be sent to the second chat program (e.g., provided by a user through one or more input devices for user interaction with the first chat program). Operation 709 receives a user selection of the balloon style through a user input device. If operation 711 determines the second chat program does not have the definition of the balloon style, operation 713 transmits the definition of the balloon style to the second chat program. Operation 715 transmits the message and an indication of using the balloon style for the message to the second chat program. Operation 717 displays at the second chat program the message using the balloon style according to the definition of the balloon style.

Although the operations in the above examples are illustrated in specific sequences, from this description, it will be appreciated that various different operation sequences and variations can be used without having to be limited to the above illustrated examples.

Figure 8:
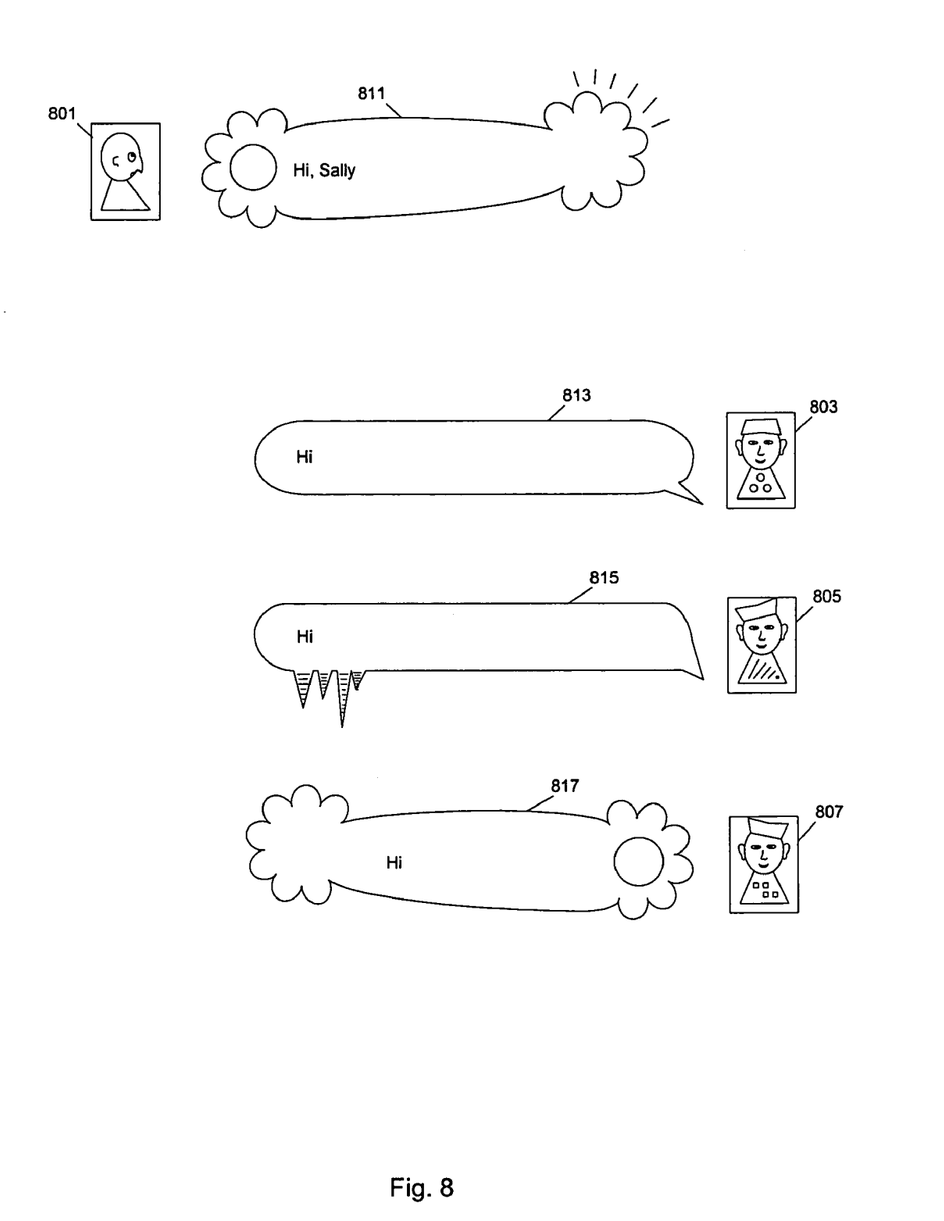
FIG. 8 shows one example of using balloons of different shapes to express emotional states according to one embodiment of the present invention.

FIG. 8 shows one example of using balloons of different shapes to express emotional states according to one embodiment of the present invention. In FIG. 8, user 801 sends a message "Hi, Sally" with a balloon 811 which has a flower and sunny impression to represent a happy, enthusiastic mood. Users 803, 805 and 807 all reply with the same text message "Hi". However, users 803, 805 and 807 use different balloon styles 813, 815 and 817 to indicate different emotional states for sending the text message. For example, user 803 uses a default balloon 813, which indicates a neutral response. User 805 uses a balloon 817 with an icy impression to indicate a cool, less friendly response. User 807 returns with a balloon 817 which has a flowery impression to indicate a happy response. Thus, although the text messages from users 803, 805 and 807 are the same, the different balloons selected by the users to express the message provide different means to the message. Thus, balloons of different styles and shapes can help to convey the meaning of the message (e.g., through the indication of the emotional state of the senders of the messages) and improve the text message communications.

Figure 9:
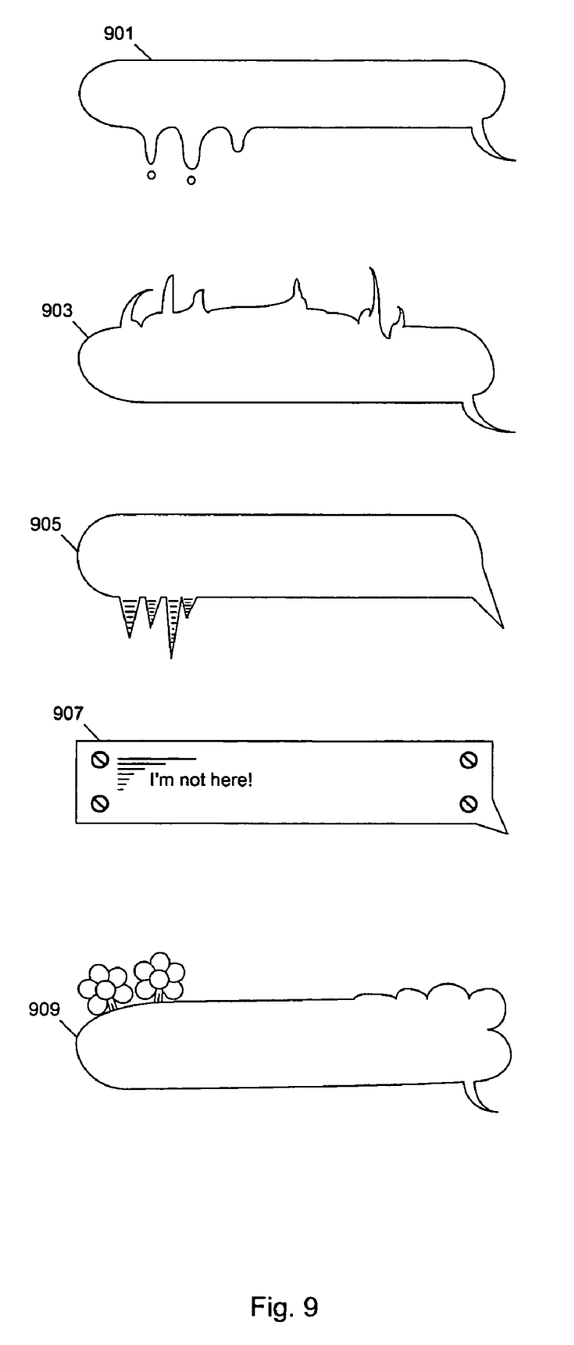
FIG. 9 shows examples of balloon styles which can be used in accordance with embodiments of the present invention.

FIG. 9 shows examples of balloon styles which can be used in accordance with embodiments of the present invention. Balloon style 901 provides an impression of envy, which may be further colored as green to express an emotional state of envy. Balloon style 903 provides an impression of flames, which may be further colored as red to express an emotional state of anger. Balloon style 905 provides an impression of ice, which may be further colored as white to express a cool, less enthusiastic response. Balloon style 907 provides an impression of mechanical assembly, which may be further rendered with metal texture to indicate an automated response. Balloon style 909 provides an impression of flowers, which may be used to indicate a happy mood. In one embodiment of the present invention, a set of commonly used balloon styles are pre-designed for easy selection by a user of a chart program. Further, a user may make custom balloon styles (e.g., through assembling pre-designed balloon components, such as flower pedals, or through drawing or painting new balloon styles) to convey user defined impressions and meanings. For example, a balloon style editor may include a user interface for a user to interactively draw a custom balloon. The balloon style editor may provide tools for drawing line segments and curve segments and/or portions of balloons to define portions of a custom balloon. Further, pre-designed balloon parts (e.g., flower pedals, call-outs) may be selected from a library to define the custom balloon. A balloon style typically includes at least one closed curve (or almost closed curve) which encloses an area intended for the placement of the message. The balloon style editor may further provide tools for transforming the pre-designed balloon parts or the user drawn line segments and curve segments and for connecting and assembling the parts into a customized balloon. The definition of the custom balloon style makes references to the pre-designed balloon parts. During the transmission of the custom balloon style from one chat program to another, it is not necessary to transmit the definition of the pre-designed balloon parts. Preferably, a balloon style is defined in a vector format so that the balloon style can be scaled to different sizes. However, a custom balloon style may also be in the form of a bitmap image. A text area (e.g., a rectangular or elliptical area) with respect to the balloon image can be defined for the placement of the text message in the balloon. Alternatively, a user may draw a custom balloon style using any available drawing (or painting) software program, which can be imported into the balloon style editor to define the text area with respect to the image of the custom balloon. The balloon style editor may automatically determine the text area (e.g., the largest closed curve loop) or a user may manually define the text area.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to display a chat message, the method comprising:
   receiving a chat message and a balloon style, wherein the balloon style includes at least one user-drawn balloon element or a user combination of a set of standard balloon constructing elements; and
   displaying the chat message in a balloon, the displaying of the balloon corresponding to the balloon style.

2. A method as in claim 1, wherein the chat message and the balloon style are received from a network connection.

3. A method as in claim 2, wherein the balloon style is selected by a user who sent the chat message.

4. A method as in claim 1, wherein receiving a chat message and a balloon style further comprises receiving the balloon style prior to receiving the chat message.

5. A method as in claim 4, further comprising:
   transmitting the chat message and the balloon style to a remote device for display.

6. A method as in claim 1, wherein the balloon style indicates an emotional state associated with the message and was selected from a library of balloon styles.

7. A method as in claim 1, wherein the balloon style indicates a predetermined message.

8. A method as in claim 7, wherein the balloon style indicates that the user is in the process of preparing a message.

9. A method as in claim 1, further comprising:
   receiving a text explanation of the balloon style.

10. A method as in claim 9, wherein the definition of the balloon style is received with the chat message through a network connection.

11. A machine readable storage medium containing executable computer program instructions which when executed by a digital processing system cause said system to perform a method to display a chat message, the method comprising:
   receiving a chat message and a balloon style through a network, wherein the balloon style includes at least one user-drawn balloon element or a user combination of a set of standard balloon constructing elements; and
   displaying the chat message in a balloon, the displaying of the balloon corresponding to the balloon style.

12. A machine readable storage medium as in claim 11, wherein the balloon style indicates an emotional state associated with the message and was selected from a library of balloon styles.

13. A machine readable storage medium as in claim 11, wherein the method further comprises:
   receiving a definition of the balloon style.

14. A machine readable storage medium as in claim 13, wherein the definition of the balloon style is user created.

15. A data processing system to display a chat message, the data processing system comprising:
   means for receiving a chat message and a balloon style, wherein the balloon style includes at least one user-drawn balloon element or a user combination of a set of standard balloon constructing elements; and means for displaying the chat message in a balloon, the displaying of the balloon corresponding to the balloon style.

16. A data processing system as in claim 15, wherein the chat message and the balloon style are received from a network connection.

17. A data processing system as in claim 16, wherein the balloon style is selected by a user who sent the chat message.

18. A data processing system as in claim 15, wherein the balloon style indicates an emotional state associated with the message and was selected from a library of balloon styles.

19. A data processing system as in claim 15, wherein the balloon style indicates a predetermined message.

20. A data processing system as in claim 19, wherein the balloon style indicates that the user is in the process of preparing a message.

21. A data processing system as in claim 15, further comprising:

means for receiving a definition of the balloon style.

22. An apparatus to display a chat message, the apparatus comprising:

a display device;

memory; and a processor coupled to the display device and the memory, the processor receiving a chat message and a balloon style and causing the display device to display the chat message in a balloon, the display of the balloon corresponding to the balloon style, wherein the balloon style includes at least one user-drawn balloon element or a user combination of a set of standard balloon constructing elements.

23. An apparatus as in claim 22, further comprising:

a communication device coupled to the processor, the processor receiving the chat message and the balloon style through the communication device.

24. An apparatus as in claim 23, wherein the balloon style is selected by a user who sent the chat message.

25. An apparatus as in claim 22, further comprising:

input devices coupled to the processor, the processor receiving the chat message and the balloon style from the input devices through user interaction.

26. An apparatus as in claim 25, further comprising:

a communication device coupled to the processor, the processor causing the communication device to transmit the chat message and the balloon style to a remote device for display.

27. An apparatus as in claim 22, wherein the balloon style indicates an emotional state associated with the message and was selected from a library of balloon styles.

28. An apparatus as in claim 22, wherein the balloon style indicates a predetermined message.

29. An apparatus as in claim 28, wherein the balloon style indicates that the user is in the process of preparing a message.

30. An apparatus as in claim 22, wherein the processor receives a definition of the balloon style.

31. A method to send a chat message, the method comprising:

receiving a user input to select a balloon style for a text message, wherein the balloon style includes at least one user-drawn balloon element or a user combination of a set of standard balloon constructing elements;

transmitting the balloon style and the text message to a remote device for display of the text message in a balloon, the display of the balloon corresponding to the balloon style.

32. A method as in claim 31, wherein the balloon style indicates an emotional state associated with the message.

33. A method as in claim 31, further comprising:

transmitting a definition of the balloon style to the remote device.

34. A machine readable storage medium containing executable computer program instructions which when executed by a digital processing system cause said system to perform a method to send a chat message, the method comprising:

receiving a user input to select a balloon style for a text message, wherein the balloon style includes at least one user-drawn balloon element or a user combination of a set of standard balloon constructing elements;

transmitting the balloon style and the text message to a remote device for display of the text message in a balloon, the display of the balloon corresponding to the balloon style.

35. A machine readable storage medium as in claim 34, wherein the balloon style indicates an emotional state associated with the message.

36. A machine readable storage medium as in claim 34, wherein the balloon style is selected from a set of predetermined balloon styles.

37. A machine readable storage medium as in claim 34, wherein the method further comprises:

transmitting a definition of the balloon style to the remote device.

38. An apparatus to send a chat message, the apparatus comprising:

a user input device to receive a text message and a user input to select a balloon style for a text message, wherein the balloon style includes at least one user-drawn balloon element or a user combination of a set of standard balloon constructing elements;

memory coupled to the user input device, the memory storing the text message; and a network communication device coupled to the memory, the network communication device transmitting the balloon style and the text message to a remote device for display of the text message in a balloon, the display of the balloon corresponding to the balloon style.

39. An apparatus as in claim 38, wherein the balloon style indicates an emotional state associated with the message.

40. An apparatus as in claim 38, wherein the memory further stores a definition of the balloon style; and, the network communication device further transmits the definition of the balloon style to the remote device.

41. An apparatus as in claim 40, wherein the definition of the balloon style is user created through the user input device.

42. A machine readable storage medium containing executable computer program instructions which when executed by a digital processing system cause said system to perform a method to customize a chat message, the method comprising:

receiving user input to define a balloon style including at least one user-drawn balloon element or a user combination of a set of standard balloon constructing elements; and storing a definition of the balloon style;

wherein the definition of the balloon style is transmitted to a remote device for display of a chat message in a balloon, the display of the balloon corresponding to the balloon style.

43. A machine readable storage medium as in claim 42, wherein the balloon style indicates an emotional state associated with the message and was selected from a library of balloon styles.

44. A machine readable storage medium as in claim 42, wherein the user input comprises input to select at least one pre-designed balloon part to define the balloon style.

45. A machine readable storage medium as in claim 44, wherein the user input comprises input to draw at least one portion of a balloon representing the balloon style.

46. A machine readable storage medium containing executable computer program instructions which when executed by a digital processing system cause said system to perform a method to customize a chat message, the method comprising:

receiving a definition of a balloon style from a first remote device, wherein the balloon style includes at least one user-drawn balloon element or a user combination of a set of standard balloon constructing elements; and storing the definition of the balloon style;

wherein, when received, a chat message associated with the balloon style is displayed in a balloon, the display of the balloon corresponding to the balloon style.

47. A machine readable storage medium as in claim 46, wherein the balloon style indicates an emotional state associated with the message.

48. A machine readable storage medium as in claim 46, further comprising:

transmitting the definition of the balloon style to a second remote device.

49. A machine readable storage medium containing balloon style data usable with executable computer program instructions which when executed by a digital processing system cause said system to perform a method to customize a chat message, the method comprising:

displaying a chat message specified with a balloon style in a balloon, the displaying of the balloon corresponding to the balloon style according to the balloon style data, wherein the balloon style includes at least one user-drawn balloon element or a user combination of a set of standard balloon constructing elements.

50. A machine readable storage medium as in claim 49, wherein the balloon style indicates an emotional state associated with the message.

51. A machine readable storage medium as in claim 50, wherein the emotional state comprises one of:

a) envy;

b) anger;

c) happy;

d) enthusiastic; and e) cool, less friendly.

52. A machine readable storage medium as in claim 50, wherein the balloon style data comprises definitions of a plurality of pre-designed balloon styles.

53. A machine readable storage medium as in claim 50, wherein the balloon style data comprises a definition of a user defined balloon style.

54. A machine readable storage medium as in claim 53, wherein the balloon style data comprises definitions of a plurality of pre-designed balloon parts; and, the a definition of a user defined balloon style makes references to at least one of the definitions of the plurality of pre-designed balloon parts.

* * * * *